Nov. 6, 1962 R. E. PHELON 3,063,002
REGULATING APPARATUS FOR PERMANENT MAGNET ALTERNATOR
Filed Nov. 18, 1959
2 Sheets-Sheet 1
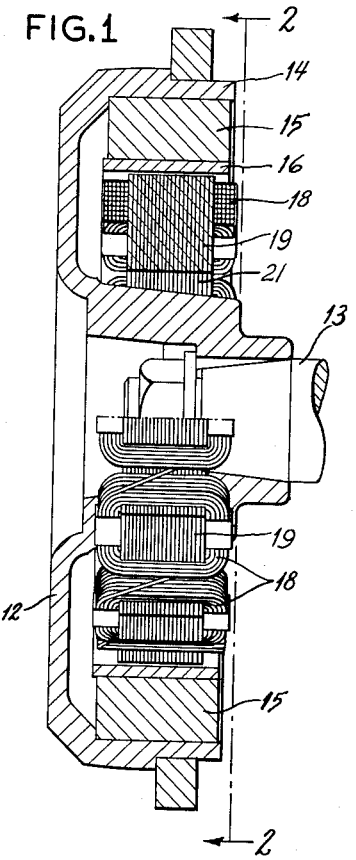
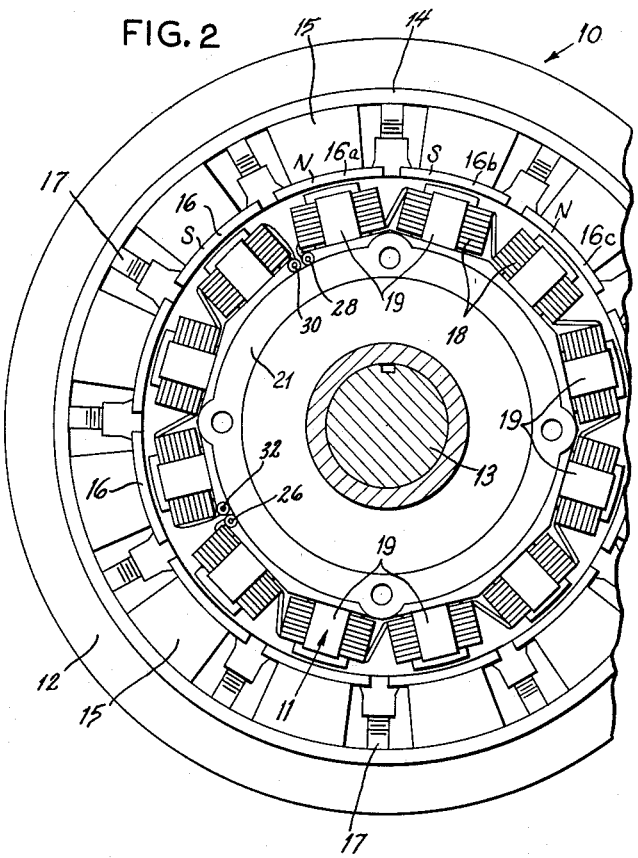
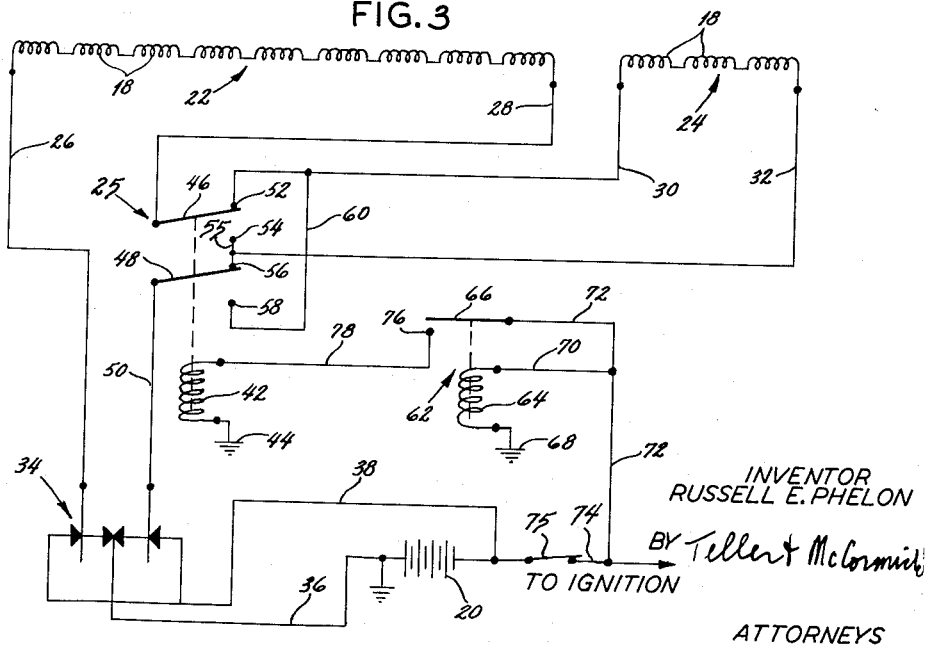
INVENTOR
RUSSELL E. PHELON
BY Tellert McCormick
ATTORNEYS

United States Patent Office 3,063,002
Patented Nov. 6, 1962

3,063,002
REGULATING APPARATUS FOR PERMANENT MAGNET ALTERNATOR
Russell E. Phelon, % R. E. Phelon Co. Inc., Longmeadow, Mass.
Filed Nov. 18, 1959, Ser. No. 855,489
6 Claims. (Cl. 322—90)

This invention relates to alternators of the type wherein permanent magnets are utilized to provide a magnetic field and, more particularly, to apparatus for regulating the output of such alternators. This application is a continuation-in-part of my application Serial No. 768,245, filed October 20, 1958, now abandoned.

It is the general object of the invention to provide regulating apparatus for a permanent magnet alternator which is adapted to regulate the effect, at the alternator load, of the electromotive forces which are developed in a portion of the alternator armature, the alternator output thus being controlled.

The drawings show preferred embodiments of the invention and such embodiments will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a vertical longitudinal section through a permanent magnet alternator showing a portion of the alternator stator in elevation.

FIG. 2 is a vertical transverse section taken along the lines 2—2 in FIG. 1.

FIG. 3 is a wiring diagram showing the connection of the regulating apparatus of the present invention with the alternator of FIGS. 1 and 2 and with a battery and rectifying means as in an automobile ignition system.

Figure 4:
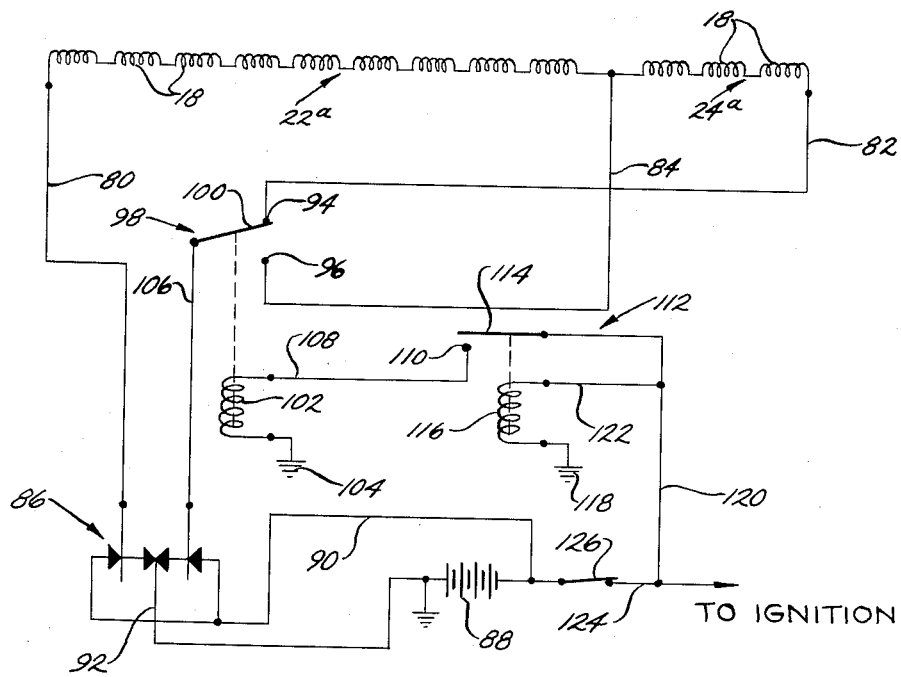
FIG. 4 is a wiring diagram generally similar to FIG. 3 but showing an alternative embodiment of the invention.

The permanent magnet alternator illustrated in FIGS. 1 and 2 is generally similar to that disclosed in the Phelon Patent No. 2,856,550, issued October 14, 1958, and entitled Electric Generator, and comprises relatively rotatable field and armature assemblies. As illustrated, the field assembly is rotatable and constitutes a rotor and the armature assembly is nonrotatable and constitutes a stator, but the invention in its broader aspects is not limited as to which assembly is rotatable. For convenience of description, it will be assumed that the field assembly is rotatable as shown and that the armature assembly is nonrotatable as shown. Said assemblies are indicated generally by the reference numerals 10 and 11 respectively.

The rotor 10 includes a rotatable flywheel 12 which is carried by a shaft 13 and has an annular portion or rim 14 which supports an annular series of circumaxially arranged equally spaced permanent magnets 15, 15. The magnets 15, 15 are preferably positioned radially and within the rim of the flywheel, and each of the magnets has associated with its inner face a pole piece 16 which provides a pole face therefor. The pole faces of all of the magnets are movable in a fixed common path. The several pole pieces 16, 16 are of such length that a gap is provided between the adjacent ends of each two adjacent pole pieces. The magnets 15, 15 and the pole pieces 16, 16 associated therewith are shown as being secured in fixed relation with the flywheel rim 14 by a plurality of fastening devices 17, 17 located respectively in the gaps between adjacent magnets and pole pieces. The several fastening devices 17, 17 each comprise a wedgelike clamping member which engages adjacent ends of two adjacent pole pieces and which is urged radially outwardly by a screw connected thereto and to the flywheel rim 14.

The several magnets 15, 15 are oppositely charged. When the magnets are arranged radially and within the flywheel rim 14 they are charged radially. The magnets 15, 15 are magnetically connected with each other at the ends thereof opposite their said pole faces. As shown, the flywheel is formed of magnetic metal and the flywheel rim provides the required magnetic connection. As the result of the alternate charging of the magnets, alternate pole pieces are N and the intervening pole pieces are S.

The armature assembly or stator 11 of the alternator comprises a plurality of coils 18, 18 which surround cores 19, 19 formed of magnetic metal. The cores engage with and are supported by a stationary circular frame or plate 21 also formed of magnetic metal. The cores and the coils are circumaxially arranged at the periphery of the frame or plate 21 and the outer pole faces of the cores are in close proximity to the path of movement of the inner faces of the pole pieces 16, 16. The engagement of one core 19 with the member 21 is clearly shown in FIG. 1.

Referring to FIG. 2, it will be observed that the two cores 19, 19 nearest the top are in register with the two pole pieces $16^a$ and $16^b$ of the magnets nearest the top and that a clockwise magnetic circuit is established through the several parts as follows: the left pole piece $16^a$ and its magnet, the flywheel rim 14, the right magnet and the pole piece $16^b$, the right core 19, the member 21 and the left core 19. Assuming clockwise rotation, it will be seen that when the rotor has moved to bring the same cores 19, 19 into register with the pole pieces $16^b$ and $16^c$, the direction of the magnetic circuit through the cores is reversed. The reversal of the circuit in the pole pieces is repeated as rotation continues, and this repeated reversal tends to generate an alternating current in the coils 18, 18.

The rotor and the stator have been described in detail in order that one embodiment of the invention may be clearly understood, but the present invention in its broader aspects is not limited in its application to a permanent magnet alternator of the particular construction or type disclosed. Further, in this connection, it is to be understood that while the regulating apparatus of the invention is shown and described hereinbelow as used with a permanent magnet alternator in the ignition system of an automobile for preventing overcharging of the battery of the automobile, the said apparatus is adaptable to a wide variety of other uses.

In the wiring diagram of FIG. 3, the armature coils 18, 18 of the alternator of FIGS. 1 and 2 are shown schematically in an automobile ignition system which includes a battery 20 connected with said coils in a manner to be described hereinbelow. The battery constitutes the load. Suitable electrical conductors, including those shown at 26, 28, 30 and 32, provide a normal connection of all of the coils in a cumulative series with each other and in series with the load. It will be understood that the term "cumulative series" is used to designate a series wherein the electrical effect of each coil, beginning with the second, is added to that of all preceding coils in the series. Thus the total voltage generated by the series is equal to the sum of all of the individual voltages.

The coils 18, 18 are preferably divided into separate first and second groups of series connected coils indicated generally at 22 and 24 respectively. While the number of coils in each group may vary widely within the scope of the invention, the alternator is shown as including 12 armature coils and the first group of coils 22 includes 9 series connected coils while the second group 24 includes 3 series connected coils.

In accordance with the invention, the voltage or electromotive force of the generator may be regulated or changed by suitable means including a switch which changes the before described normal cumulative series connections. Preferably, regulation is effected by eliminating some of the coils from the cumulative series. When there are two groups of coils, the coils of one group may be eliminated, as for instance those of group 24. In the embodiment of the invention shown in FIG. 4, the group 24 coils are merely eliminated by disconnection. In the embodiment of the invention shown in FIG. 3, the group 24 coils are not only eliminated from the normal cumulative series, but they are reconnected reversely so that they oppose or partly nullify the electromotive force generated by the group 22 coils. It is within the scope of the invention to connect the switch means with the alternator armature coils and load in various ways so as to regulate the alternator output in keeping with varying requirements.

A switch means indicated generally at 25 in FIG. 3 is connected with the first and second groups of coils 22 and 24 and with the battery 20. Said switch means is operable to selectively reverse the connection of the second group of coils 24 relative to the first group of coils 22 and relative to the battery 20. Thus, depending on the position of the switch means 25, the electromotive forces developed in the group of coils 24 will either supplement or oppose the electromotive forces developed in the group of coils 22 and the alternator output may be established selectively at two different levels. As will be explained more fully hereinafter, regulation of the alternator output in such manner is particularly well suited to the requirements of the ignition system in which the switch means is shown incorporated.

As shown in FIGS. 2 and 3, first and second lead conductors 26 and 28 extend respectively from opposite ends of the first group of coils 22 and third and fourth lead conductors 30 and 32 extend respectively from opposite ends of the second group of coils 24. The first lead conductor 26 is connected with the battery 20 through a rectifying means 34, said conductor extending from the group of coils 22 to the rectifying means and two conductors 36 and 38 extending from said rectifying means to opposite sides of said battery. The rectifying means 34 forms no part of the present invention and need not be described in detail, any of a number of commercially available rectifiers being suitable for the purpose intended. The second, third and fourth lead conductors, 28, 30 and 32 extend from the armature coils 18, 18 to the switch means 25 of the present invention.

In preferred form, the switch means 25 comprises a relay having a coil 42 which is locally grounded at a terminal 44. The coil 42 is adapted to be energized and de-energized to move first and second switch members 46 and 48 from one position to another. As shown, the switch members 46 and 48 are moved to a lower position when the coil 42 is energized and said switch members are moved to an upper position when said coil is de-energized.

The first switch member 46 is connected to the second lead conductor 28 which extends from the first group of series connected armature coils 22. The second switch member 48 is connected to a conductor 50 which extends therefrom to the rectifying means 34. Thus, the switch member 48 is connected to the battery 20 for supplying current thereto as will be seen hereinafter.

A contact 52 adapted to be engaged by the switch member 46 when said member is in its upper position is disposed at the end of the third lead conductor 30. A contact 54 adapted to be engaged by the switch member 46 in its lower position is disposed at one end of a branch conductor 55 which is connected to the end of the fourth lead conductor 32. A second contact 56 which is disposed at the opposite end of the branch conductor 55 is adapted to be engaged by the switch member 48 when said member is in its upper position. In its lower position, the switch member 48 engages a contact 58 disposed at the end of a branch conductor 60 extending from the third lead conductor 30.

From the foregoing, it will be apparent that when the coil 42 of the relay 25 is de-energized, the switch member 46 connects the second lead conductor 28 with the third lead conductor 30. The switch member 48 connects the fourth lead conductor 32 with the conductor 50 and thus connects said fourth conductor with the rectifying means 34 and with the battery 20. It will be seen that with the first and second group of armature coils connected in a cumulative series and with the battery 20, the electromotive forces developed in the second group of coils 24 will supplement the electromotive forces developed in the first group of coils 22. The alternator will, in this instance, operate in a conventional manner and by virtue of the rectifier 34, a known voltage will be provided and a known direct current will be supplied to the battery 20 for charging the same.

It will be further apparent from the foregoing that when the relay coil 42 is energized, the switch member 46 connects the second lead conductor 28 with the fourth lead conductor 32. The switch member 48 connects the third lead conductor 30 with the conductor 50 and thus with the battery 20. With the two groups of armature coils 22 and 24 connected with the battery in such manner, the second group of coils 24 is eliminated from the cumulative series and the electromotive forces developed therein oppose the electromotive forces developed in the first group of coils 22, the output voltage of the alternator thus being substantially reduced.

It will be seen that the output voltage reducing operation of the relay 25 may be put to advantageous use in preventing overcharging of the battery 20. By establishing a mode of operation of the relay wherein it is energized to suitably reduce the alternator output voltage when the battery 20 is fully charged, current flow to said battery may be terminated and overcharging thereof avoided. It will be further seen that since the charging voltage of the battery 20 will increase when the battery is fully charged, the appropriate time for energizing the relay coil 42 may be readily determined.

The manner in which the coil 42 is energized and de-energized responsive to battery charging voltage when the regulating apparatus of the invention is used with a battery charging alternator may be varied widely. In the preferred embodiment of the invention shown, there is provided a second switch means which is connected in circuit with the battery 20 and with the relay 25. The second switch means is operable responsive to battery charging voltage to energize and de-energize the coil 42 of the relay 25 and thus controls the alternator output in accordance with the requirements of the battery.

As shown, the second switch means comprises a relay indicated generally at 62 and having a coil 64 and a switch member 66. The coil 64 of the relay is locally grounded at a terminal 68 and is connected by a conductor 70 to a conductor 72. The conductor 72 is connected to a conductor 74 which extends from the battery 20 to additional circuits of the ignition system which are not shown. The usual ignition switch is shown disposed in the conductor 74 at 75 and may be assumed to remain closed as shown at all times for the purposes of this description.

The conductor 72 extends beyond its junction with the conductor 70 and is also connected to the switch member 66 of the relay 62. A contact 76 is engaged by the switch member 66 when the coil 64 is energized to move said member to a lower position. The contact 76 is disposed on the end of a conductor 78 which extends therefrom to the coil 42 of the relay 25. Thus, a supply circuit from the battery 20 to the relay coil 42 is provided and includes the conductors 74 and 72, the switch member 66 and the conductor 78.

The relay coil 64 is energized to move the switch member 66 to its lower position to complete the supply circuit to the relay coil 42 when the charging voltage of the battery 20 exceeds a predetermined level indicating that said battery is fully charged. A reduction in the alternator output voltage results and overcharging of the battery 20 is avoided. When battery charging voltage decreases to a value below said predetermined level, the coil 64 is de-energized to move the switch member 66 to its upper position and the relay coil 42 is thereby de-energized permitting the alternator to resume normal operation.

In the alternative embodiment of the invention shown in FIG. 4, a first group 22ª of nine armature coils 18, 18 is normally connected in a cumulative series with a second group 24ª of three armature coils 18, 18. First and second lead conductors 80 and 82 extend from opposite ends of the series of twelve armature coils 18, 18 comprising said first and second groups of coils and a third lead conductor 84 is connected between said first and second groups of coils. The first lead conductor 80 is connected with a rectifying means which is indicated generally at 86 and which is in turn connected to a battery 88 by means of conductors 90 and 92. The second and third lead conductors extend to contacts 94 and 96 respectively in a relay indicated generally by the reference numeral 98.

In addition to the contacts 94 and 96, the relay 98 comprises a switch member 100 having one position (upper position as shown) in which it engages the contact 94 and another position (lower position) in which it engages the contact 96. A relay coil 102 is provided with a local ground 104 and is adapted to be energized to move the switch member 100 to its said lower position, de-energization of the said relay coil resulting in movement of said switch member to its upper position. Connected with the switch member 100 and leading to the rectifying means 86 is a conductor 106.

It will be apparent that the coils of the second group 24ª may be eliminated from the cumulative series with the coils of the first group 22ª by suitable operation of the switch member 100 by the coil 102. That is, the coils 18, 18 of the second group 24ª will be disconnected from the rectifying means 86 and the battery 88 by movement of the switch member 100 to its lower position. This will obviously reduce the alternator output voltage to the battery and overcharging thereof will be avoided. Maximum or full alternator output voltage may be obtained when desired by effecting movement of the switch member 100 to its upper position.

The manner in which movement of the switch member 100 is controlled in the FIG. 4 embodiment of the invention is or may be the same as in the FIG. 3 embodiment thereof. A conductor 108 extending from the relay coil 102 is connected with a contact 110 in a second relay indicated generally at 112. The said relay has a switch member 114 and a coil 116 locally grounded at 118. A conductor 120 extending from the switch member 114 and having a branch line 122 connected with the coil 116 is connected with a conductor 124 which leads from the battery 88 and which is provided with an ignition switch 126. The relay coil 116 operates to close the switch member 114 to connect the lines 108 and 120 and energize the relay coil 102 in response to battery charging voltage in excess of a predetermined level. As stated, energization of the coil 102 results in movement of the switch member 100 to its lower position and disconnection of the second group of armature coils 24ª effecting a reduction in alternator output voltage.

The invention claimed is:

1. In combination with an alternator having a permanent magnet field and an armature which are relatively rotatable and the latter of which includes a plurality of coils connected together and connected with a load, apparatus for regulating the alternator output comprising switch means connected in circuit with the armature coils and the load and operable selectively to reverse the connection of one or more of the armature coils with the remaining armature coils and with the load so that the electromotive force developed in said reversely connected coil or coils opposes the electromotive force developed in the remaining armature coils to reduce the alternator output.

2. In combination with an alternator having a rotor carrying a plurality of permanent magnets and a stationary armature carrying a plurality of coils divided into separate first and second groups of series connected coils, apparatus for regulating the alternator output comprising first and second lead conductors respectively connected to opposite ends of the first group of armature coils and third and fourth lead conductors respectively connected to opposite ends of the second group of armature coils, said first lead conductor being connected with a load, and switch means connected with said second, third and fourth lead conductors and with the load and operable in one position to connect said second lead conductor with said third lead conductor and said fourth lead conductor with the load and operable in another position to connect said second lead conductor with said fourth lead conductor and said third lead conductor with the load whereby the electromotive force developed in said second group of armature coils respectively supplements and opposes the electromotive force developed in said first group of armature coils.

3. In combination, an alternator comprising a rotor which includes an annular series of equally spaced alternately charged permanent magnets and also comprising a nonrotatable armature which includes an annular series of equally spaced coils each having a magnetic core therewithin, electrical conductors serving to provide a normal connection of all of the alternator coils in a cumulative series with each other and serving also to connect said series of coils with a load, and apparatus for regulating alternator output including a switch means connected in circuit with said conductors and load and operable to selectively maintain all of said coils in said cumulative series and to eliminate some of said coils from said series to reduce output to the load.

4. In combination, an alternator comprising a rotor which includes an annular series of equally spaced alternately charged permanent magnets and also comprising a nonrotatable armature which includes an annular series of equally spaced coils each having a magnetic core therewithin, electrical conductors serving to provide a normal connection of all of the alternator coils in a cumulative series with each other and serving also to connect said series of coils with a load, and apparatus for regulating alternator output including a switch means connected in said conductors and operable to disconnect one or more of said alternator coils from the load whereby to reduce alternator output to the load.

5. In combination, an alternator having a rotor carrying a plurality of permanent magnets and a stationary armature carrying a plurality of series connected coils, first and second lead conductors respectively connected to opposite ends of said series of armature coils, a third lead conductor connected between the ends of said series connected coils, switch means connected with said second and third lead conductors and operable in one position to connect said first and second lead conductors in circuit with a load, said switch means being operable in another position to disconnect said second lead conductor and to connect said first and third lead conductors with the load whereby to reduce alternator output to the load.

6. In combination, an alternator having a rotor carrying a plurality of permanent magnets and a stationary armature carrying a plurality of series connected coils, a first lead conductor connected between one end of said series of armature coils and a load, a switch means, a second lead conductor connected between an opposite end of said series of armature coils and said switch means, a third lead conductor connected to said series of armature coils between said one and opposite ends thereof and connected also with said switch means, and a load conductor connected between said switch means and load, said switch means being operable in one position to interconnect said second lead conductor and said load conductor and being operable in another position to disconnect said second lead conductor and said load conductor and to interconnect said third lead conductor and said load conductor.

References Cited in the file of this patent

UNITED STATES PATENTS

| | | |
|---|---|---|
| 2,506,809 | Nims | May 9, 1950 |
| 2,809,301 | Short | Oct. 8, 1957 |
| 2,898,542 | Wasko et al. | Aug. 4, 1959 |